(12) United States Patent
Law et al.

(10) Patent No.: US 11,030,076 B2
(45) Date of Patent: Jun. 8, 2021

(54) DEBUGGING METHOD

(71) Applicant: Undo Ltd., Cambridge (GB)

(72) Inventors: Gregory Edward Warwick Law, Cambridge (GB); Julian Philip Smith, Cambridge (GB); Thomas Paul Perry, Cambridge (GB); Nicholas Peter Bull, Cambridge (GB); Geoffrey Finn Grimwood, Cambridge (GB)

(73) Assignee: Undo Ltd., Cambridge (GB)

( * ) Notice: Subject to any disclaimer, the term of this patent is extended or adjusted under 35 U.S.C. 154(b) by 0 days.

(21) Appl. No.: 15/848,056

(22) Filed: Dec. 20, 2017

(65) Prior Publication Data

US 2018/0173612 A1 Jun. 21, 2018

(30) Foreign Application Priority Data

Dec. 20, 2016 (GB) .................................... 1621776

(51) Int. Cl.
| | | |
|---|---|---|
| *G06F 11/36* | (2006.01) | |
| *G06F 11/30* | (2006.01) | |
| *G06F 11/34* | (2006.01) | |

(52) U.S. Cl.
CPC ........ *G06F 11/3636* (2013.01); *G06F 11/302* (2013.01); *G06F 11/3476* (2013.01); *G06F 11/3668* (2013.01)

(58) Field of Classification Search
CPC . G06F 11/302; G06G 11/302; G06G 11/3636; G06G 11/3476; G06G 11/3668
USPC ......................................................... 717/124
See application file for complete search history.

(56) References Cited

U.S. PATENT DOCUMENTS

| | | | | |
|---|---|---|---|---|
| 6,691,308 B1* | 2/2004 | Kasper | .................... | G06F 9/268 712/211 |
| 6,901,581 B1* | 5/2005 | Schneider | ........... | G06F 11/3636 714/E11.212 |
| 8,250,542 B1* | 8/2012 | Ball | .................... | G06F 11/3636 717/124 |
| 2004/0153878 A1* | 8/2004 | Bromwich | .......... | G06F 11/3636 714/48 |
| 2008/0244535 A1 | 10/2008 | Nelson et al. | | |
| 2009/0327574 A1 | 12/2009 | Xu et al. | | |

(Continued)

OTHER PUBLICATIONS

EP17208695.1 Extended European Search Report dated May 18, 2018 (9 pages).
GB1621776.2 Search Report dated May 30, 2017 (3 pages).

*Primary Examiner* — Chat C Do
*Assistant Examiner* — Bradford F Wheaton
(74) *Attorney, Agent, or Firm* — Michael Best & Friedrich LLP

(57) ABSTRACT

A method of generating an output log for analysis of a computer program, the method comprising: receiving a recording of an execution of the program; receiving an additional print instruction to print a value of a data item and an indication of a point in the program at which the additional print instruction is to be evaluated; determining a corresponding point in the recording of the execution based upon the indication of the point in the program; and evaluating the additional print instruction based upon the recording of the execution and the determined corresponding point to determine an output of the additional print instruction for insertion into the output log.

14 Claims, 13 Drawing Sheets

(56) References Cited

U.S. PATENT DOCUMENTS

| | | | |
|---|---|---|---|
| 2010/0211762 A1* | 8/2010 | Saha | G06F 9/30065 |
| | | | 712/205 |
| 2010/0325571 A1* | 12/2010 | Kodosky | G05B 19/0426 |
| | | | 715/772 |
| 2012/0036501 A1* | 2/2012 | Evensen | G06F 11/3636 |
| | | | 717/128 |
| 2016/0342499 A1* | 11/2016 | Cheng | G06F 11/3664 |

* cited by examiner

```
.section .data
buf:

.section .text
.globl main
main:

mov  $buf, %ecx  #ecx points at buf
.start:

mov  $3, %eax    #do syscall #3 (read)
  mov  $0, %ebx    #from fd 0 (stdin)
  mov  $1, %edx    #read a single char
  int  $0x80       #make the system call mov  $4, %eax    #do syscall #4 (write)
  mov  $1, %ebx    #to fd 1 (stdout)
                   #ecx still at buff
                   #edx still contains 1
  int  $0x80       #make the system call cmpb $10, buff   #did user hit enter?
  jne  .start      #if not, round again
  ret
```

Figure 8

DEBUGGING METHOD

FIELD

The present invention relates to methods, apparatus and computer program code to facilitate debugging of a computer program.

BACKGROUND

A conventional method of debugging a computer program is to add print instructions at strategic points in the source code to output the value of select variables. In this way, a user may analyse program behaviour to determine a source of an error. Once print instructions have been added to the source code, the program is re-compiled and re-executed to generate the additional output for inspection. Inspection and analysis of the additional output may lead the user towards the source of the error and further print instruments may be added to the source code to further narrow the user's search for the source of the error.

Often a debugging process will require many iterations of the above process: addition of print instructions, re-compilation and re-execution, inspection and analysis of output data, before the source of the error can be accurately identified and fixed. Performing multiple iterations requires a substantial amount of time, a problem which is exacerbated if the program itself requires a large amount of time to compile or to execute.

Furthermore, the addition of extra print instructions to the source code may affect the timing of asynchronous events. This may cause previously reproducible errors to disappear or to manifest in a different way. In addition, each time the program is re-run, the conditions under which the program is run may change, which may also affect the reproducibility of errors and the determination of the corresponding source or sources. Therefore, improved methods of debugging are required.

SUMMARY

According to a first aspect, there is provided a method of generating an output log for analysis of a computer program, the method comprising: receiving a recording of an execution of the program; receiving an additional print instruction to print a value of a data item and an indication of a point in the program at which the additional print instruction is to be evaluated; determining a corresponding point in the recording of the execution based upon the indication of the point in the program; and evaluating the additional print instruction based upon the recording of the execution and the determined corresponding point to determine an output of the additional print instruction for insertion into the output log.

By evaluating the additional print instruction based upon a recorded execution, the additional print instruction may be evaluated as if the instruction was present in the original execution. Furthermore, as the print instruction is evaluated based on a recording, it can be evaluated without having to perform a new execution of the program. As the program environment is always identical for every replay of the recording, any errors in the program will identically manifest in each playback of the recording. This ensures that any post-hoc print statements are actually targeting the same errors each time the recording is replayed, regardless of whether any print statements are added. By contrast, each time a program is re-executed, the environment in which the program executes will not be identical and as such, errors under examination may not manifest identically upon re-execution.

It will be appreciated that the value of the data item being printed may be the result of an expression defined in the print instruction and need not be the value of a named variable.

It will also be appreciated that the output log need not be from a single source and may be collated from a plurality sources. For example, the output log may a combination of print instructions to write to standard output, standard error or another specified log file.

The method may further comprise generating the output log. The output log may comprise the output of one or more existing print instructions executed in the recording of the execution of the program and the output of the additional print instruction; and the output log may be arranged sequentially according to the order in which instructions are executed in the recording of the execution and the determined corresponding point in the recording.

In this way, the output of the print instruction appears in a position as if the print instruction was part of the original execution. This allows a user to see the output of any post-hoc debugging statements in the correct order along with the original output to enable more accurate debugging.

Inserting the output of the additional print instruction in the output log may further comprise: inserting the output of the additional print instruction into an intermediate data structure, wherein the intermediate data structure is arranged to store the output of any print instructions in the program; and generating an output log based upon the intermediate data structure.

The intermediate data structure may act as a cache for storing the output of any existing print instructions in the program. As the output of the existing print instructions remains the same between replays of the recording, the use of an intermediate data structure as a cache provides a more efficient method of generating an output log. In this way, existing print instructions need only be evaluated once per recording of the execution.

Each data item stored in the intermediate data structure may be associated with an identifier and the intermediate data structure may be ordered based upon the identifier. In this way, the intermediate data structure may be ordered such that it is easy to insert the output of any print instructions in the correct position and the output log may be more easily generated as no further re-ordering is required.

The identifier may comprise a first portion based upon a point in time of the recording of the execution of the program and a second portion based upon a location identifier associated with a point in the program. The first portion may be based upon a basic block count, that is, the number of basic blocks that have been executed so far in the replay of the recording of the execution. The second portion may be based upon an instruction address. In this way, the ordering (based on the identifier) of the intermediate data structure may correspond to the order in which instructions are executed in the recording of the execution, thereby providing an efficient method of determining the correct position to insert the output of any print instructions and to generate an output log without the need for further sorting and re-ordering of retrieved data items from the intermediate data structure.

Determining the corresponding point in the recording of the execution of the program may further comprise: determining a location identifier associated with a point in the program based upon the received indication; replaying the recording; and halting replay of the recording based upon the determined location identifier. In this way, the recording may be searched to determine at which point in the recording of the execution the additional print instruction is to be evaluated.

Determining a location identifier may further comprise determining an instruction address in the program based upon the received indication. Halting replay of the recording may further comprise: determining that a program counter value is equivalent to the instruction address; and halting replay of the recording based upon the determination. In this way, the corresponding point in the recording of the execution may be determined by appropriately iterating through the recording of the execution of the program.

Evaluating the additional print instruction may be further based upon program state information at the corresponding point in the recording of the execution of the program. As such, the additional print instruction may be evaluated as if the additional print instruction were present in the original execution.

The method may further comprise displaying the output log in a window of a graphical user interface. Replaying the recording of the execution may be based upon the visible region of the window. In this way, the recording is only replayed to generate the parts of the output log visible to the user thereby reducing the amount of resources required and improving efficiency.

According to another aspect, there is provided a computer program comprising computer readable instructions configured to cause a computer to carry out a method according to the first aspect.

According to another aspect, there is provided a computer apparatus comprising a processor arranged to read and execute instructions in memory and wherein the processor readable instructions comprise instructions arranged to cause the computer to carry out a method according to the first aspect.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the aspects.

BRIEF DESCRIPTION OF THE DRAWINGS

Embodiments of the invention will now be described, by way of example, with reference to the accompanying drawings, in which:

FIG. 8 shows an example Linux program;

DETAILED DESCRIPTION

Figure 1A:
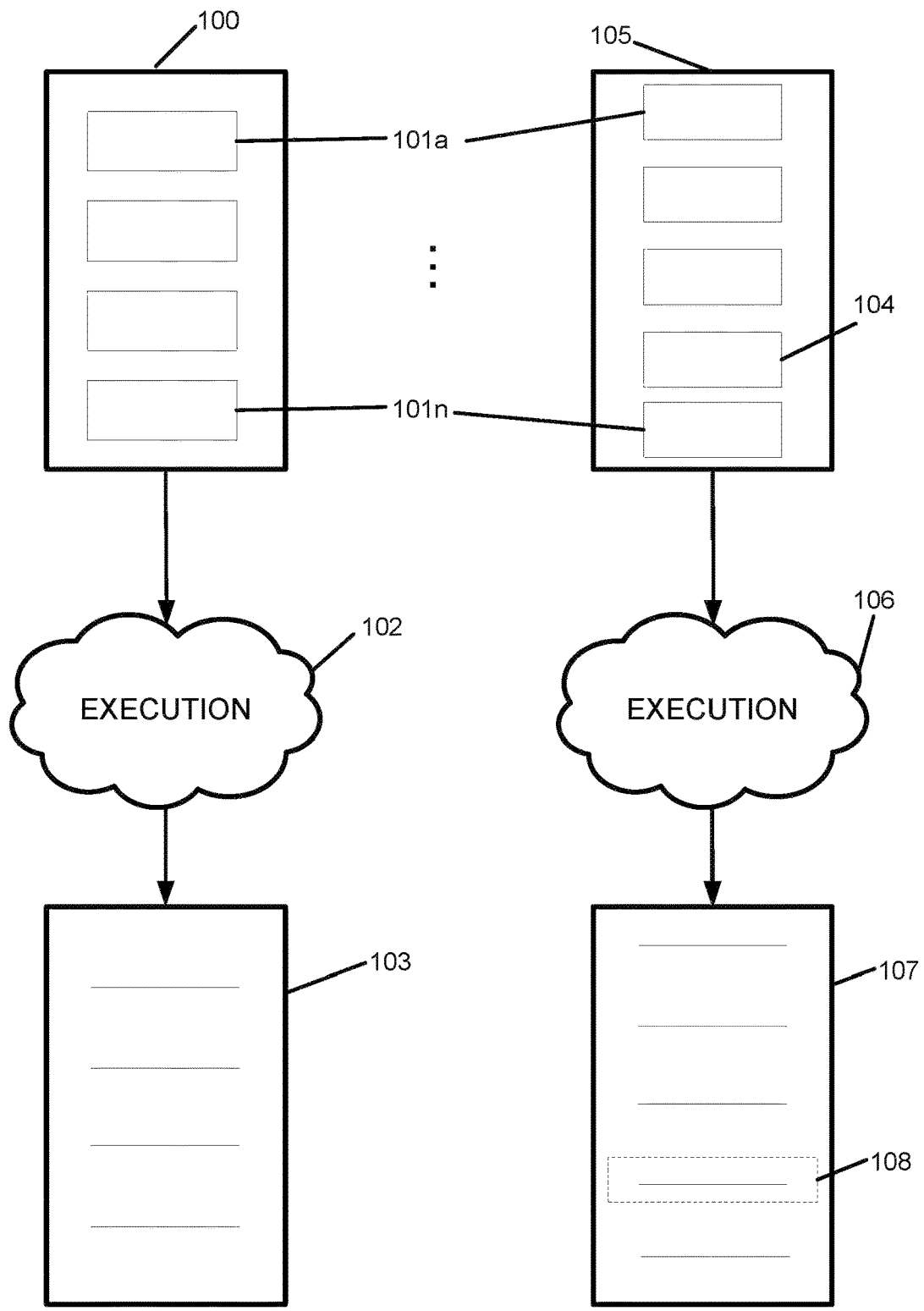
FIG. 1A is a schematic illustration of a prior art method of generating an output log.
Figure 1B:
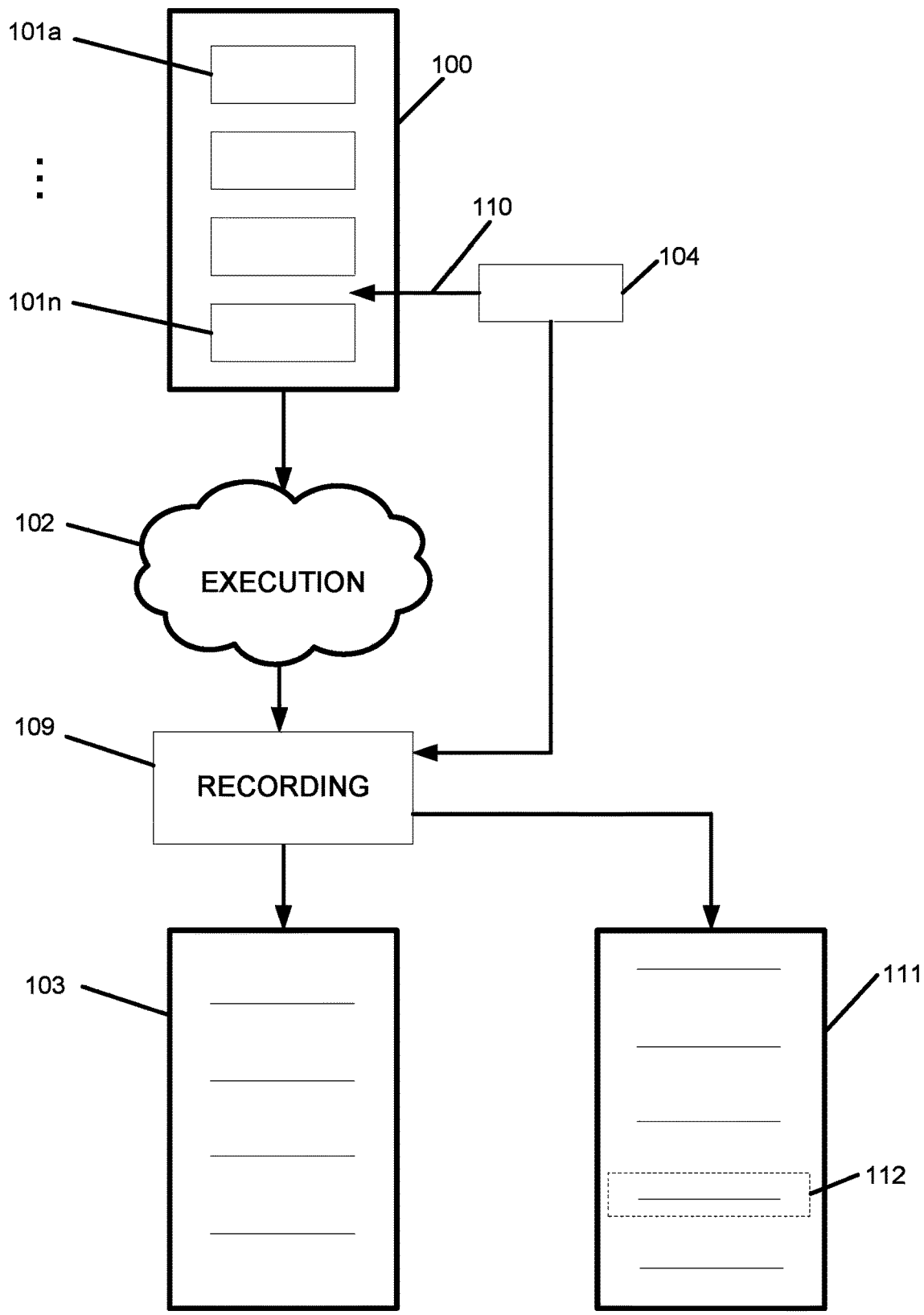
FIG. 1B is a schematic illustration of generating an output log in accordance with the present invention.

Referring to FIGS. 1A and 1B, a computer program 100 comprises a plurality of print instructions 101a . . . 101n. FIG. 1A depicts the prior art, in which the computer program 100 is executed in a first execution 102 of the computer program 100 and generates a first output log 103 based upon the first execution 102 of the plurality of print instructions 101a . . . 101n.

A user may modify computer program 100 with an additional print instruction 104 to generate a modified computer program 105 to provide additional output to help locate a source of an error observed during the execution 102. The modified computer program 105 is re-compiled and executed in a second execution 106 and generates a second output log 107 based upon the second execution 106 including the additional print instruction 104. The second output log 107 includes an entry 108 corresponding to the additional print instruction 104.

By contrast, FIG. 1B shows an embodiment of the invention comprising only a single execution 102 in which the computer program 100 is executed. The execution 102 is recorded to provide a recording 109 of the execution 102. A first output log 103 may be generated based upon replaying of the recording 109 of the execution 102 of the computer program 100 or from the execution 102. To provide additional output, instead of generating a modified computer program including an additional print instruction as in the prior art, in the example embodiment of FIG. 1B, the user may provide an additional print instruction 104 together with an indication 110 of a point in the computer program 100 at which the additional print instruction 104 is to be evaluated. A second output log 111 is generated based upon replaying the recording 109 of the execution 102 of the computer program 100. The second output log 111 includes an entry 112 for the additional print instruction 104 as if the additional print instruction 104 was present at the indicated point 110 in the computer program 100. That is, in the embodiment of FIG. 1B, the computer program 100 is not re-compiled or fully re-executed in order to generate an output log including an output based upon the additional print instruction.

As the first output log 103 and the second output log 111 are generated based upon the recording 109, it can be ensured that the second output log 111 (which includes an entry 112 for the additional print instruction 104) is generated in an identical context to that in which the first output log 103 was generated. This ensures that the output of the additional print instruction 104 does indeed target an error under examination as originally manifested in the computer program 100 and can be used to reliably determine the source of the error.

Furthermore, as a recording 109 of the execution 102 is replayed instead of re-executing the computer program 100 to generate the second output log 111, the addition of the additional print instruction 104 does not affect the original execution 102 of the computer program 100 and further ensures that the error under examination manifests itself identically across all debugging attempts.

It will be appreciated that the recording 109 of the execution 102 of the computer program 100 and the generation of output logs 103, 111, may be performed on the same computing device or on different computing devices. For example, a first computing device may execute the computer program 100 and record the execution 102 to provide a recording 109 of the execution 102. The recording 109 of the execution 102 may be transmitted to a second computing device upon which debugging of the computer program 100 is to take place. Replaying of the recording 109 of the execution 102 to generate the first and/or second output logs 103, 111 may be performed on the second computing device.

Figure 2:
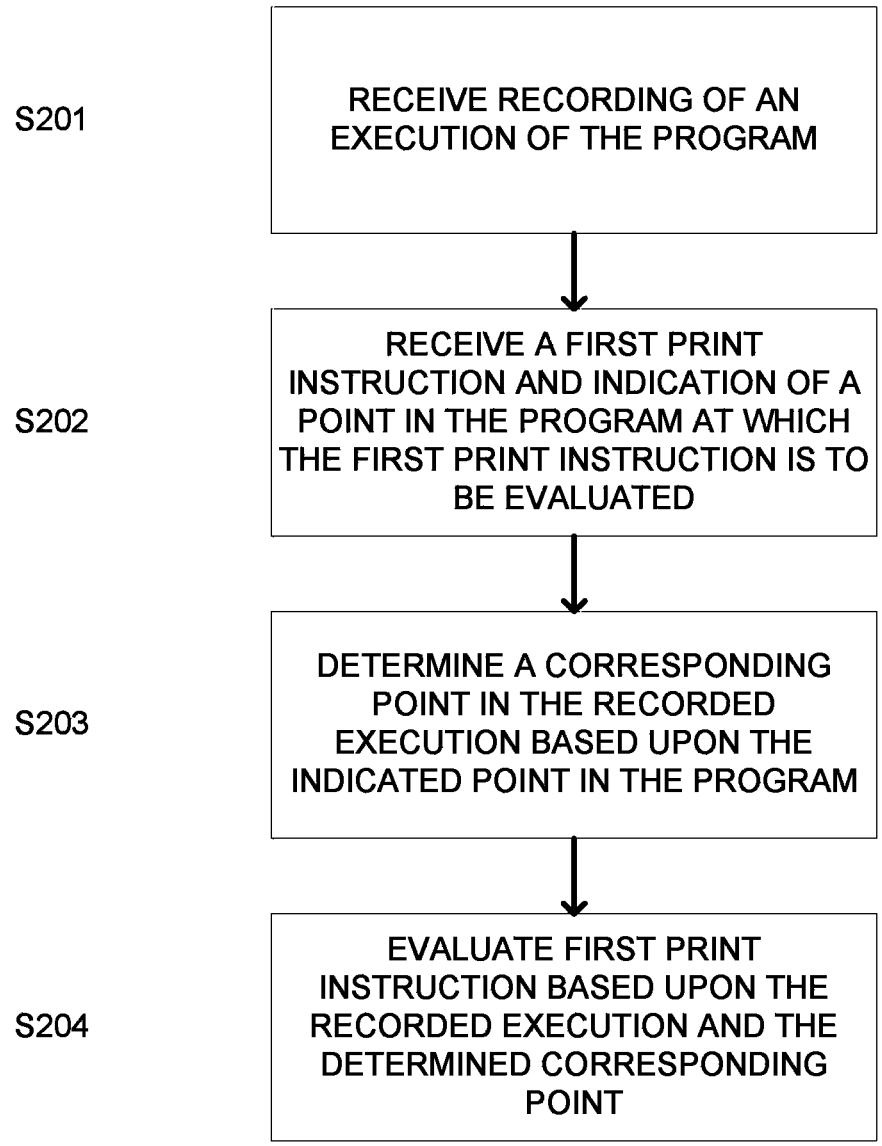
FIG. 2 is a flowchart showing processing carried out to generate an output log.

Referring now to FIG. 2, exemplary processing for generating the output log 111 of FIG. 1B is now described in more detail. At step S201, a recording of an execution 102 of the computer program 100 is received. At step S202, an additional print instruction 104 is received. The additional print instruction 104 is an instruction to print a value of a data item. An indication 110 of a point in the computer program 100 at which the additional print instruction 104 is to be evaluated is also received at step S202. At step S203, a corresponding point in the recording 109 of the execution 102 is determined based upon the indication 110. Processing to determine a corresponding point in the recording 109 of the execution 102 is described in more detail below with reference to FIG. 4.

At step S204, the additional print instruction 104 is evaluated based upon the recording 109 of the execution 102 and the corresponding point determined at step S203, in order to determine an output of the first print instruction 104.

Processing may further comprise inserting the output of the additional print instruction 104 in the output log 111 based upon the indication 110 of the point in the computer program 100, wherein the output log 111 is arranged sequentially according to the order in which instructions are executed in the recording 109 of the execution 102 of the program 100. That is, the output of the additional print instruction 104 may appear in sequence in the output log 111 as if the additional print instruction was part of the original execution 102. Therefore, the output log 111 may be arranged such that the output of the additional print instruction 104 will be inserted into the output log 111 in a position after the output of any print instructions that are executed before the additional print instruction 104. Likewise, the output of the additional print instruction 104 will be inserted into the output log 111 in a position before the output of any print instructions that are executed after the additional print instruction 104.

The recording 109 of the execution 102 received at step S201 may take any suitable form provided that the state of the computer program 100 may be determined at any point during replay of the recording 109. An exemplary method of recording an execution of a computer program is described in U.S. Pat. No. 9,268,666 which discloses methods and techniques for backwards debugging. This is described in more detail below.

The additional print instruction 104 received at step S202 may be provided in the same format as a print instruction defined by the programming language used to write the computer program 100. The additional print instruction 104 may define a data item, such as a variable, or an expression, the value of which is to be output, in addition to a format in which the output should be printed.

The processing of FIG. 2 may be performed by a debugger. The indication 110 of the point in the program 100 at which the additional print instruction 104 is to be evaluated may be provided by a user selection in a graphical user interface of the debugger. For example, in an exemplary embodiment a user may select a line in a display of the source code of the computer program in the debugger to provide the indication 110. Alternatively, the indication 110 may be a textual command, for example, the indication 110 may comprise the name of a source code file and a line number.

It will be appreciated that if the indicated point occurs, for example, within a loop or within a function that is called multiple times during the execution of the program 100, there may be a plurality of points at which the additional print instruction 104 is to be evaluated. Therefore, steps S203 and S204 (which determine a corresponding point in the recording 109 of the execution 102 and evaluate the additional print instruction 104) may be performed for each of the plurality of corresponding points. As such, a plurality of entries 112 may be generated for the additional print instruction 104 in the output log 111.

Figure 3:
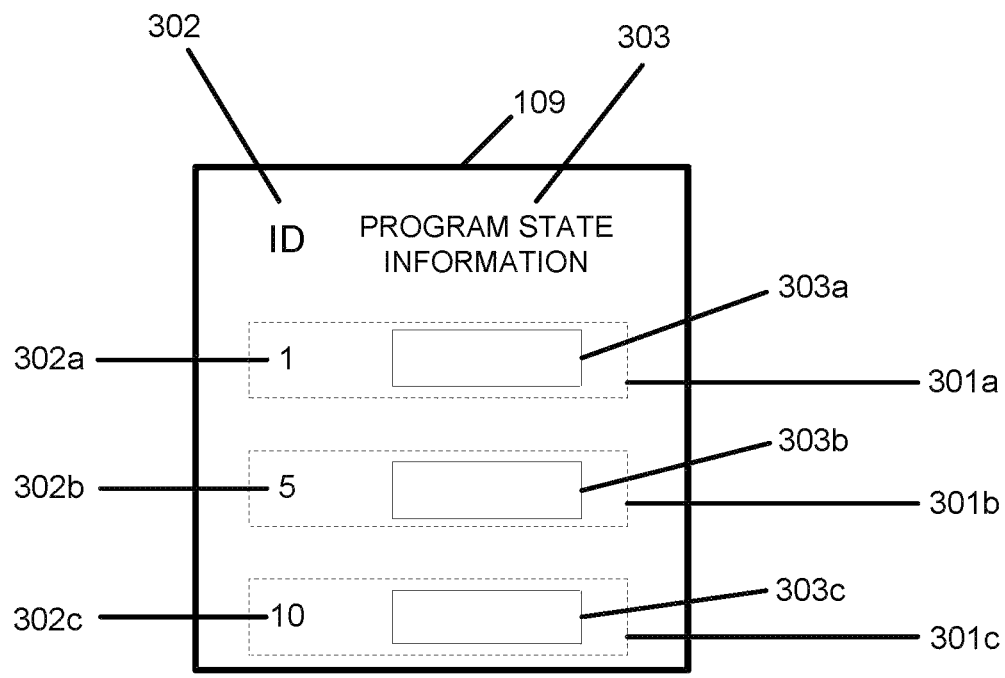
FIG. 3 is a schematic illustration of a plurality of entries in a recording of an execution of a program.

Referring now to FIG. 3, an exemplary format of the recording 109 of the execution 102 is described in more detail. The recording 109 of the execution 102 may comprise program state information recorded throughout the execution 102 of the program 100. That is, program state information may be logged at selected points during the execution 102 of the program 100. As shown in FIG. 3, the recording 109 of the execution 102 may comprise a plurality of log entries 301*a* . . . 301*c*, each comprising an identifier 302 and program state information 303 associated with the identifier 302. In FIG. 3, identifier 302*a* is associated with entry 301*a* comprising program state information 303*a*, identifier 302*b* is associated with entry 301*b* comprising program state information 303*b* and identifier 302*c* is associated with entry 301*c* comprising program state information 303*c*.

The identifier 302 may be based upon a point in time in the recording 109 of the execution 102 of the program 100. For example, the identifier 302 may be a "basic block count", that is, a count of the number of basic blocks executed so far. The identifier 302 may comprise a plurality of values, for example, the identifier 302 may further comprise a "program counter" value as well as a basic block count. It will be appreciated that the identifier 302 may be of any suitable format. For example, whilst FIG. 3 depicts a single integer value for simplicity, the identifier may comprise a plurality of values and may be a tuple of values. Furthermore, the values need not be integer values or values in base 10.

It will also be appreciated that the recording 109 of the execution 102 may comprise other data in order to enable the recording 109 of the execution 102 to be replayed. Such other data may be included as appropriate depending on the method of generating the recording. Further details in relation to generating a recording are described in more detail below.

Figure 4:
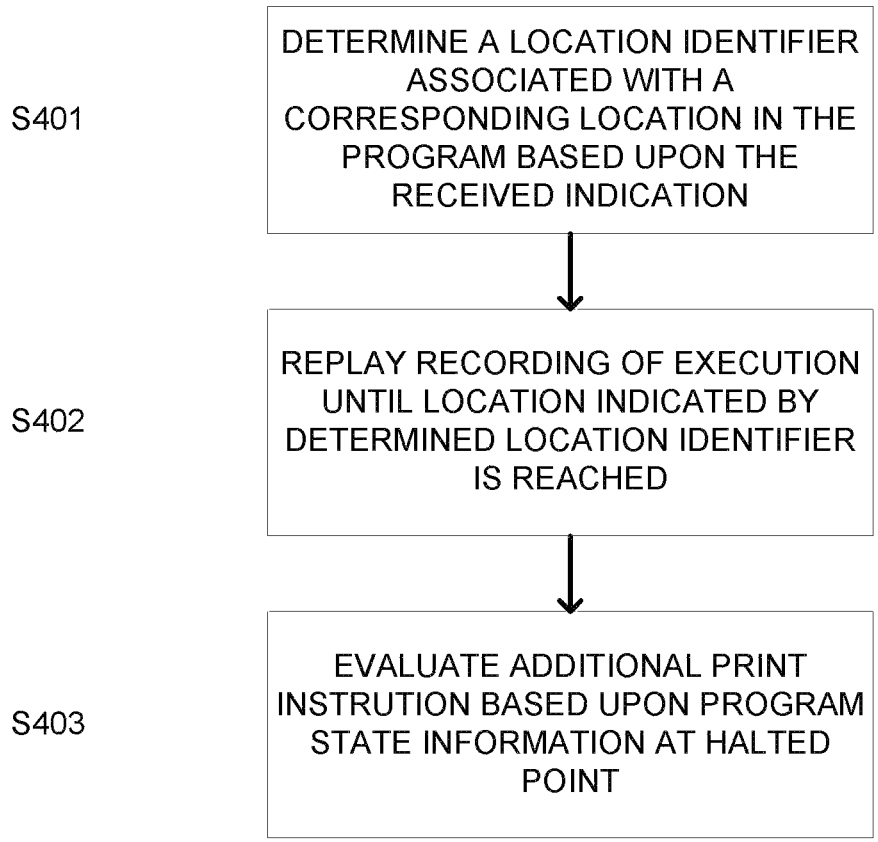
FIG. 4 is a flowchart showing processing carried out to evaluate an additional print instruction.

Referring now to FIG. 4, an exemplary implementation of the processing of steps S203 and S204 in conjunction with the exemplary format for the recording 109 depicted in FIG. 3 is now described in more detail. At step S401, a location identifier associated with a point in the program 100 is determined based upon the indication 110 received at step S202. For example, the location identifier may be an address of an instruction corresponding to the indicated point 110 at which the additional print instruction 104 would be located in the program 100.

At step S402, the recording 109 of the execution 102 is replayed until the additional print instruction 104 is to be executed as identified by the location identifier determined at step S401. For example, if the location identifier is an instruction address, the program counter value at the current point in time in recording 109 may be compared to the instruction address. If the program counter value matches the instruction address, then it may be determined that the additional print instruction 104 is to be evaluated. It will be appreciated that the recording 109 may be replayed from the beginning of the recording 109 or from the program state information 303 corresponding to a later entry in the recording 109 as appropriate.

If a debugger is used, steps S401 and S402 may be achieved by setting an internal breakpoint at the indicated point 110. The debugger may automatically halt replay of the recording 109 when the internal breakpoint is reached.

At step S403, the additional print instruction 104 may be evaluated based upon the program state information at the halted point in the replay of the recording 109 of the execution 102. In this way, the additional print instruction 104 can be evaluated as if the additional print instruction 104 was present in the program 100 at the indicated point 110. The output of the additional print instruction 104 may be stored in an intermediate data structure for creating an output log 111 as discussed below.

It will be appreciated that the indicated point 110 at which the additional print instruction 104 is to be evaluated at may occur multiple times throughout the recording 109 of the execution 102. As such, replaying of the recording 109 of the execution 102 may continue in order to determine if the additional print instruction 104 is to be evaluated at a later point in time in the recording 109. Replay may also continue if further additional print instructions are to be evaluated. Replay may continue from the halted point or be restarted based upon the program state information 303 from another entry in the recording 109.

As described above, it may be advantageous to insert the output of the additional print instruction 104 at a position in the output log 111 such that it appears that the additional print instruction 104 was present at the indicated point 110 in the program 100. One exemplary method may be to replace a previously generated output log 103 with a new output log 111 in which both existing print instructions 101a . . . 101n and the additional print instruction 104 are evaluated during replay of the recording 109. This method however may be inefficient if a user incrementally adds additional print instructions 104 to debug the program 100, in particular if the program 100 has a long execution time.

A more efficient method may be to use an intermediate data structure to log the output of any existing print instructions 101a . . . 101n present in the program 100 and the additional print instruction 104. During a replaying of the recording 109 of the execution 102, any print instructions or equivalent instructions to write to standard output, standard error or any other specified output file of interest may be detected. The output of these write instructions may be logged in the intermediate data structure. In this way, the intermediate data structure acts as a cache to be used for generating an output log and the existing print instructions 101a . . . 101n need only be evaluated once per recording 109 of the execution 102.

Figure 5:
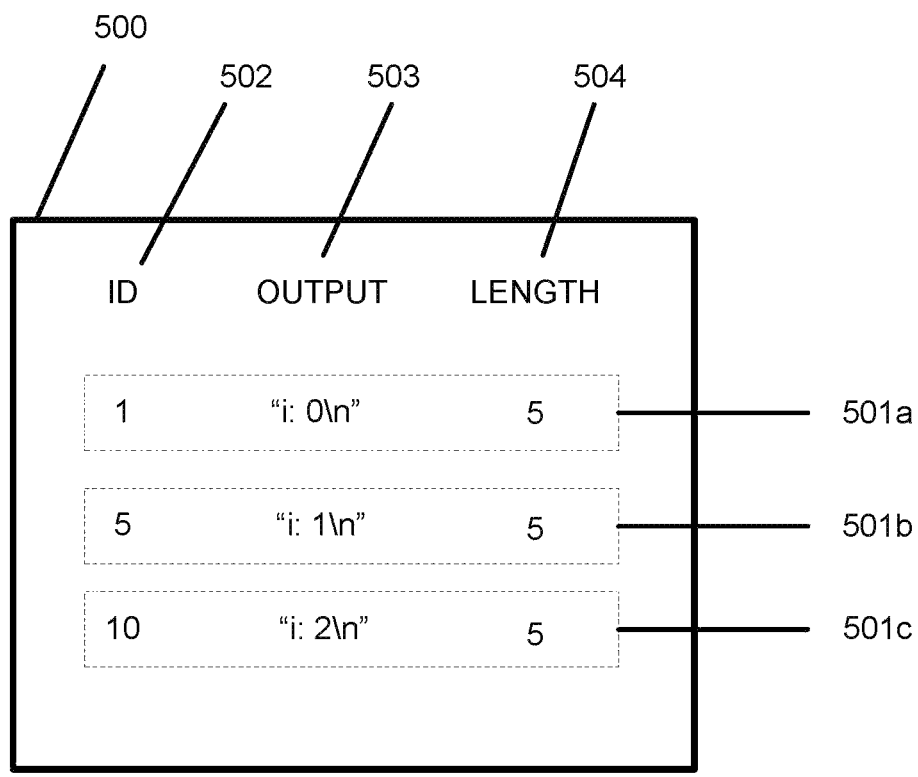
FIG. 5 is a schematic illustration of an intermediate data structure that may be used in generating an output log.

In more detail, referring now to FIG. 5, an intermediate data structure, which will be referred to as a registry 500, may comprise a plurality of entries 501a . . . 501c, collectively referred to as 501. Each entry in the registry may be associated with an identifier 502. The identifier 502 may be based upon the identifier 302 indicating a point in time in the recording 109 of the execution 102 of the program 100 and the location identifier associated with a point in the program 100 at which the print instruction is evaluated. For example, the identifier may be a tuple comprising a basic block count and an instruction address (program counter value). The entries 501 in the register 500 may be ordered based upon the identifier 502 such that the entries 501 are ordered in sequence.

An entry 501 may also comprise the data output 503 of the print instruction and the length 504 of the data.

Figure 6:
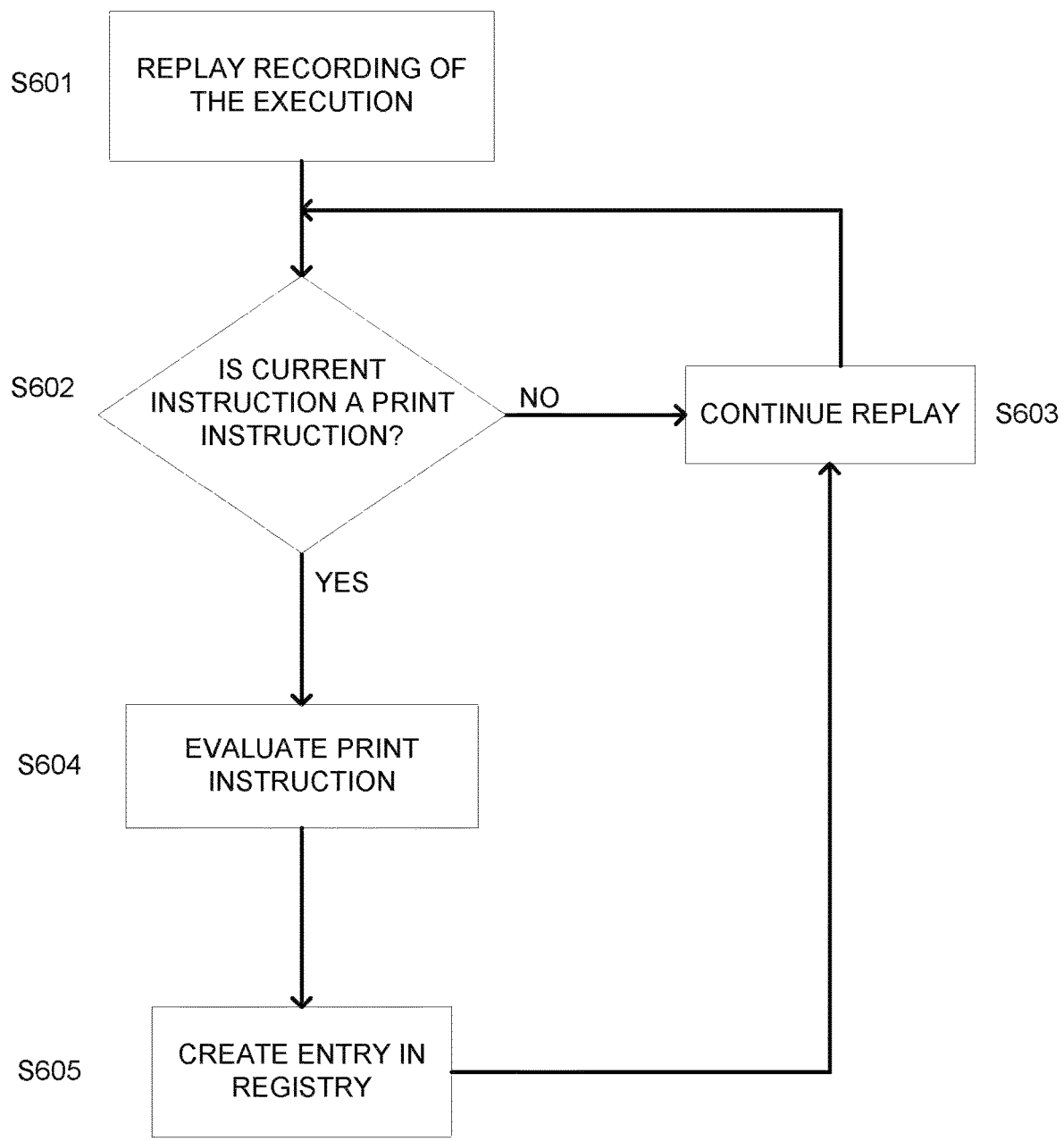
FIG. 6 is a flowchart showing processing carried out to generate the intermediate data structure of FIG. 5.

Referring now to FIG. 6, exemplary processing to generate the registry 500 is described. At step S601, the recording 109 of the execution 102 is replayed. The recording 109 may be replayed from the beginning of the recording 109 or may be replayed from a later point if it is desired to generate a registry for a subset of the print instructions in the program 100.

At step S602, it is determined whether the current instruction to be replayed is a print instruction or other specified write instruction that should be logged. If the current instruction is not a print instruction, processing continues to step S603 at which replay of the recording 109 continues until the check at step S602 is satisfied.

If the current instruction is determined to be a print instruction, processing continues at step S604 at which the print instruction is evaluated. An entry for the print instruction is then created at step S605 with the corresponding identifier 502, data 503 and length 504 values.

It is advantageous to maintain the registry 500 such that entries may be easily retrieved in sequence according to the order in which instructions are executed in the recording 109 of the execution 102 to generate an output log. It is also advantageous to maintain the registry 500 such that it is easy to create and insert new entries into the registry. The registry 500 may be of any suitable data structure. For example, the registry 500 may be an ordered binary tree, sorted based upon the identifier 502.

An entry for the evaluated additional print instruction 104 may be created and inserted into the registry 500 based upon the identifier 302 indicating a point in time of the recording 109 of the execution 102 and the location identifier associated with the point in the program 100 at which the additional print instruction 104 was evaluated at as described above with reference to FIG. 4.

Registry entries 501 may then be accessed in sequence to generate an output log 111 of the computer program 100 including an entry 112 in the output log 111 for the additional print instruction 104. As such, the entry 112 for the additional print instruction 104 appears in sequence in the output log 111 along with the print instructions 101a . . . 101n that are present in the computer program 100 as if the additional print instruction 104 was also present in the execution 102 of the computer program 100.

Whilst processing for the evaluation of the additional print instruction 104 and the generation of the registry 500 have been described separately, it is possible to combine the processing of FIGS. 4 and 6. For example, as the recording 109 of the execution 102 is being replayed to generate the registry 500, the point at which the additional print instruction 104 is to be evaluated may be reached. The additional print instruction 104 may be evaluated when this point is reached and inserted into the registry 500. Replay of the recording 109 of the execution 102 may continue to generate the remainder of the registry 500.

Furthermore, it will be appreciated that the registry 500 need only be created once for the recording 109 of the execution 102 as the output of the print instructions 101a . . . 101n present in the program 100 will not change between each replay of the recording 109 of the execution 102. A copy of the registry 500 comprising only entries corresponding to the print instructions 101a . . . 101n present in the program 100 may be kept to avoid having to regenerate the registry 500 if, for example, after having analysed the output log 111, the user chooses to remove an additional print instruction 104 and add alternative additional print instructions 104 to confirm the user's hypothesis in relation to the source of the error.

It will also be appreciated that a user may provide a plurality of additional print instructions 104. Each additional print instruction 104 may be evaluated, inserted into the generated registry 500 at the correct position and an output log 111 generated from the registry. The output log 111 includes a plurality of entries 112 corresponding to each of the plurality of print instructions 104 as if the plurality of print instructions 104 were present in the execution 102.

It may also be possible to generate the registry 500 at the same time as generating the recording 109 of the execution 102 of the computer program 100. The practicalities of this may be dependent on whether the method of recording supports generating a registry 500 and whether such processing would have a negative impact on the execution of the computer program for recording.

The output log 111 may be displayed in a window of a graphical user interface. The entry 112 corresponding to the additional print instruction 104 may be displayed in a different colour to the entries from the print instructions 101a . . . 101n present in the computer program 100. This enables a user to quickly determine the output from the additional print instruction 104 and to quickly locate the relevant entries in the displayed output log.

In addition, the size of the display window may be used to more efficiently evaluate both the already present print instructions 101a . . . 101n and the additional print instruction 104 forming the output log 111. For example, it will be appreciated that the display window, due to its size, may only display the entries of a particular set of print instructions. Therefore, it may be possible to only replay the recording 109 of the execution 102 corresponding to the visible set of the print instructions. If the display window is scrolled down, replay of the recording 109 of the execution 102 may continue in order to evaluate the next set of print instructions for display. If the display window is scrolled up to view earlier print instructions, replay may be restarted from an earlier point in the recording 109 of the execution 102 to display the output of earlier print instructions. If the size of the display window is modified, replay may continue as appropriate based upon the new visible region. In any case, replay of the recording 109 of the execution 109 may continue in anticipation of any user actions to minimise any loading times and caching may be employed to prevent any unnecessary replay.

Techniques for Recording Execution of a Program and Backwards Debugging

Broadly a backwards debugger allows a program to be executed in such a manner that it appears that the execution is backwards, that is in a reverse direction to the normal direction of program code execution. Thus in a backwards debugger is a debugger that allows a program being debugged to be rewound to an earlier state, and then allows the user to inspect the program's state at that earlier point. Such a debugger ideally provides commands to allow the user to step the program back in small well-defined increments, such as single source line; a machine instruction; step backwards into, out of, or over function calls and the like.

We will describe bidirectional or backwards debugging where (preferably) substantially the complete state of a running computer program can be examined at any point in that program's history. This uses a mechanism to 'unwind' the program's execution. This is a difficult problem, because as a program executes previous states are generally irretrievably lost if action is not taken to record them (for example, writing to a memory location causes whatever information was previously at that memory location to be lost). There are two approaches to solving this problem: firstly to log every state transition as the program executes; secondly, to re-execute the program from an earlier recorded state to reach the desired point in its history. The first suffers from several problems, including slow forwards execution of the program, and the generating of large amounts of data as the program executes. The second approach is generally more efficient but requires that non-determinism be removed on re-execution so that the program follows exactly the same path and transitions through exactly the same states each time it is re-executed.

Figure 7:
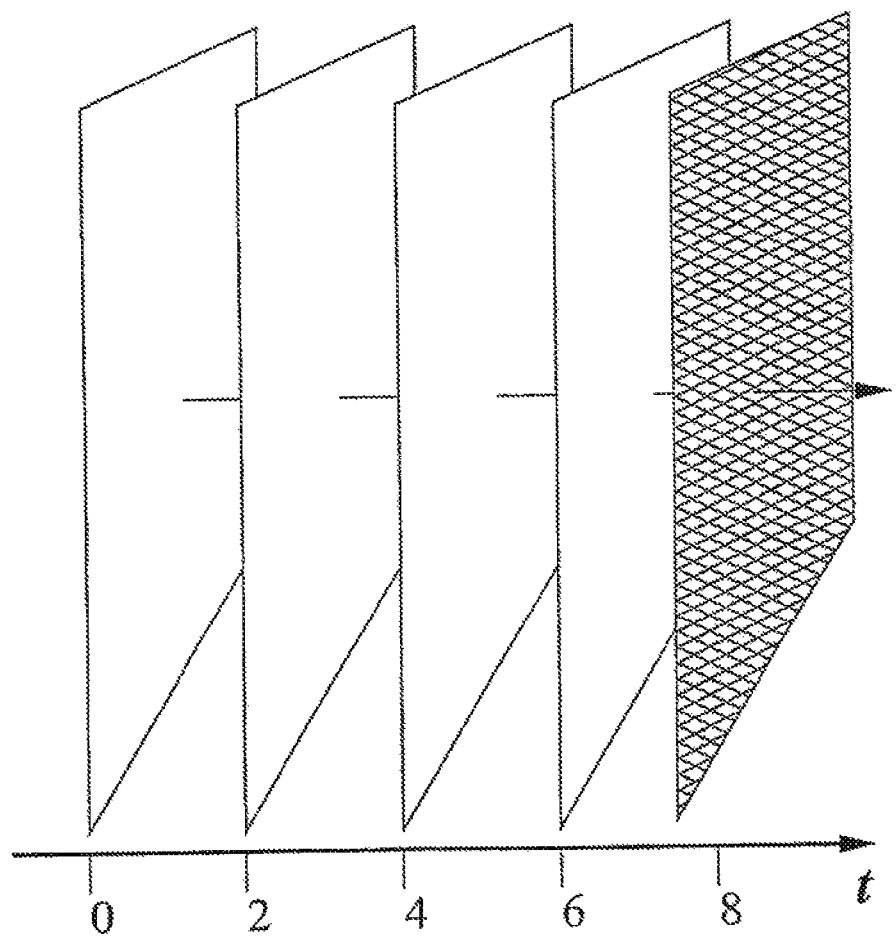
FIG. 7 shows a running program with snapshots at regular 2 second intervals.

We describe a mechanism whereby a 'snapshot' is periodically taken of a program as it runs. To determine the program's state at a given time tin its history, we start with the snapshot taken most recently before time t, and execute the program forwards from that snapshot to time t. For example, FIG. 7 depicts a program under execution. The program has been running for a little over 7 seconds, with snapshots having been taken every 2 seconds. In order to find the state of this program at t=5 s the snapshot taken at 4 s is replayed for 1 s. We use the inherent determinism of a computer to ensure that the when the snapshot of the program is replayed to time t, it will have exactly the same state as had the original program at time t. The UNIX fork system call provides one mechanism to snapshot a process.

Unfortunately, while a computer itself is deterministic, computer programs do not run deterministically, due to non-deterministic inputs. That is, when we say a computer is deterministic we mean that given the same set of inputs, it will always run through the same state changes to the same result. Therefore, if we wish to ensure that a snapshot of a program is replayed exactly as the original, we should ensure that exactly the same inputs are provided to the replayed program as were provided to the original.

Fortunately, most modern, 'protected' operating systems provide a sanitised 'virtual environment' in which programs are run, commonly referred to as a process. An important feature of processes in this context is that they strictly limit the computer resources that are accessible to a program, making it practical to control all sources of non-determinism that may influence a program's execution. These resources include the memory that is accessible by the process, as well as operating system resources, such as files and peripherals. We define all such resources as the process state. The memory and register set of a process make up its internal state, while operating system resources that it may access make up its external state. The controlled environment of a process means that with the help of instrumentation it is practical to eliminate substantially all significant sources of non-determinism during execution of the process.

We have identified four categories of non-determinism for a computer process executing on a protected operating system:

1) Non-deterministic instructions are instructions which may yield different results when executed by a process in a given internal state. The most common form of non-deterministic instruction is the system call (i.e. the instruction used to make a request of the operating system). For example, if a process issues a system call to read a key press from the user, the results will be different depending on which key the user presses. Another example of a non-deterministic instruction is the Intel IA32 rdtsc instruction, which obtains the approximate number of CPU clock ticks since power on.
2) A program executing multiple threads will show non-determinism because the threads' respective transactions on the program's state will occur in an order that is non-deterministic. This is true of threads being time-sliced onto a single processor (because the operating system will time-slice at non-deterministic times), and of threads being run in parallel on multiprocessor systems (because concurrent threads will execute at slightly different rates, due to various external effects including interrupts).
3) Asynchronous events are events issued to the process from the operating system that are not the direct result of an action of that process. Examples include a thread switch on a multithreaded system, or a timer signal on a UNIX system.
4) Shared memory is memory that when a location read by the program being debugged does not necessarily return the value most recently written to that location by the program being debugged. For example, this might be because the memory is accessible by more than one process, or because the memory is written to asynchronously by the operating system or by a peripheral device (often known as DMA—Direct Memory Access). As such out-of-band modifications are performed outside of the context of the program being debugged, this may result in non-determinism during re-execution.

Preferably a bidirectional or backwards debugging system should be able to work in all circumstances, and preferably therefore the aforementioned sources of non-determinism should be eliminated. To achieve this, all non-deterministic events are recorded as the debugged process executes. When replaying from a snapshot in order to obtain the program's state at some earlier time in history, the recorded non-deterministic events are faithfully replayed. The mechanism used to employ this is described in the following section.

We employ a technique of machine code instrumentation in order to record and replay sources of non-determinism. Our instrumentation is lightweight, in that it modifies the instrumented program only slightly, and is suitable for use with variable length instruction sets, such as Intel IA32.

We instrument by intercepting control flow at regular intervals in the code. Sections of code between interception are known as basic blocks. A basic block contains no control flow instructions, and no non-deterministic instructions— that is, a basic block contains no jumps (conditional or otherwise) or function calls, nor system calls or other non-deterministic instructions, or reads from shared memory. Control flow and non-deterministic instructions are therefore termed basic block terminators.

An instrumented program is run such that all the basic blocks are executed in the same order and with the same results as would be the case with its equivalent uninstrumented program. The instrumentation code is called between each basic block as the instrumented program executes. Each of the program's original basic blocks are copied into a new section of memory, and the basic block terminator instruction is translated into one or more instructions that ensure the instrumentation code is called before control continues appropriately.

As an example, consider the Linux program shown in FIG. 8, written in Intel IA32 assembler (using GNU/AT&T syntax):

This simple program reads characters from stdin, and echos them to stdout. The program contains four basic blocks, terminated respectively by the two int $0x80 instructions, the jne and the ret instruction at the end.

For convenience, we term the uninstrumented program P, and its instrumented equivalent P'. For each basic block there is an uninstrumented basic block Bn, and a corresponding instrumented basic block B'n.

Figure 9:
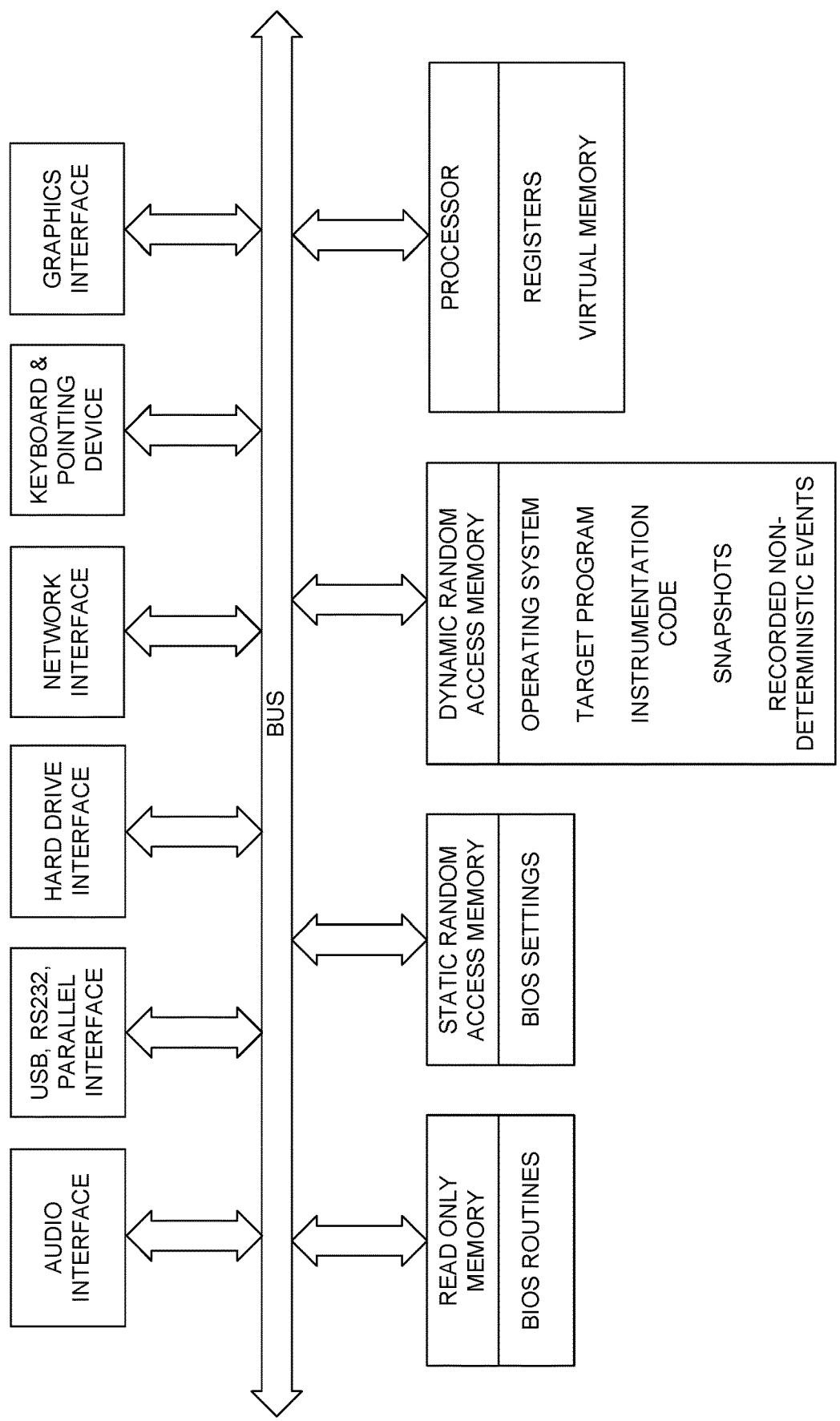
FIG. 9 shows an example of a computer system.

FIG. 9 shows an example of a computer system on which the program may be executed and on which bi-directional debugging may be performed. The target program and the debugger both reside in physical memory. Processor registers may be captured and stored in snapshots along with memory used by the target program process. The debugger may operate within the virtual memory environment provided by the processor and the operating system, or it may operate on a single process computer.

Figure 10:
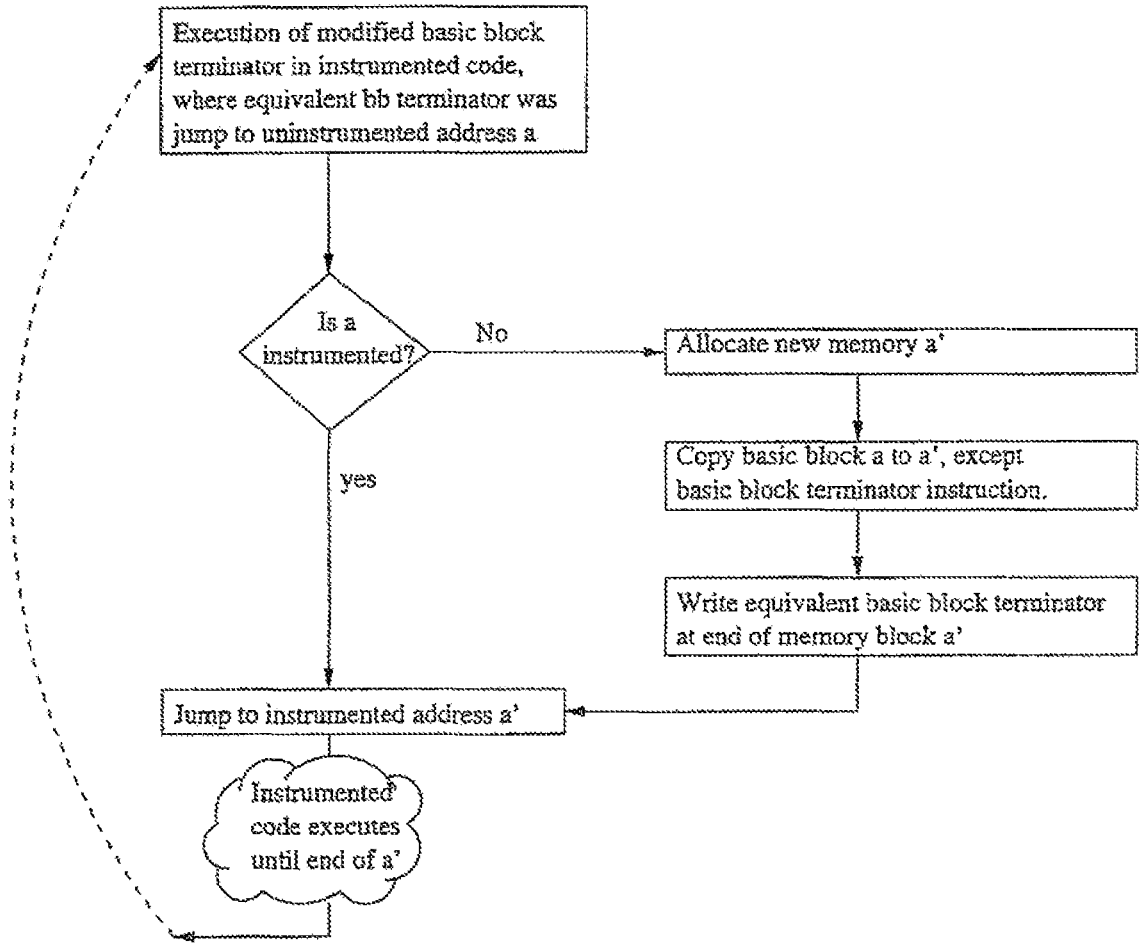
FIG. 10 shows a flowchart showing an instrumentation algorithm.

FIG. 10 shows a flowchart that illustrates the instrumentation algorithm. (Note that algorithm instrumented code in an 'on-demand' fashion, as that program executes; an ahead of time algorithm is also practical.)

Figure 11:
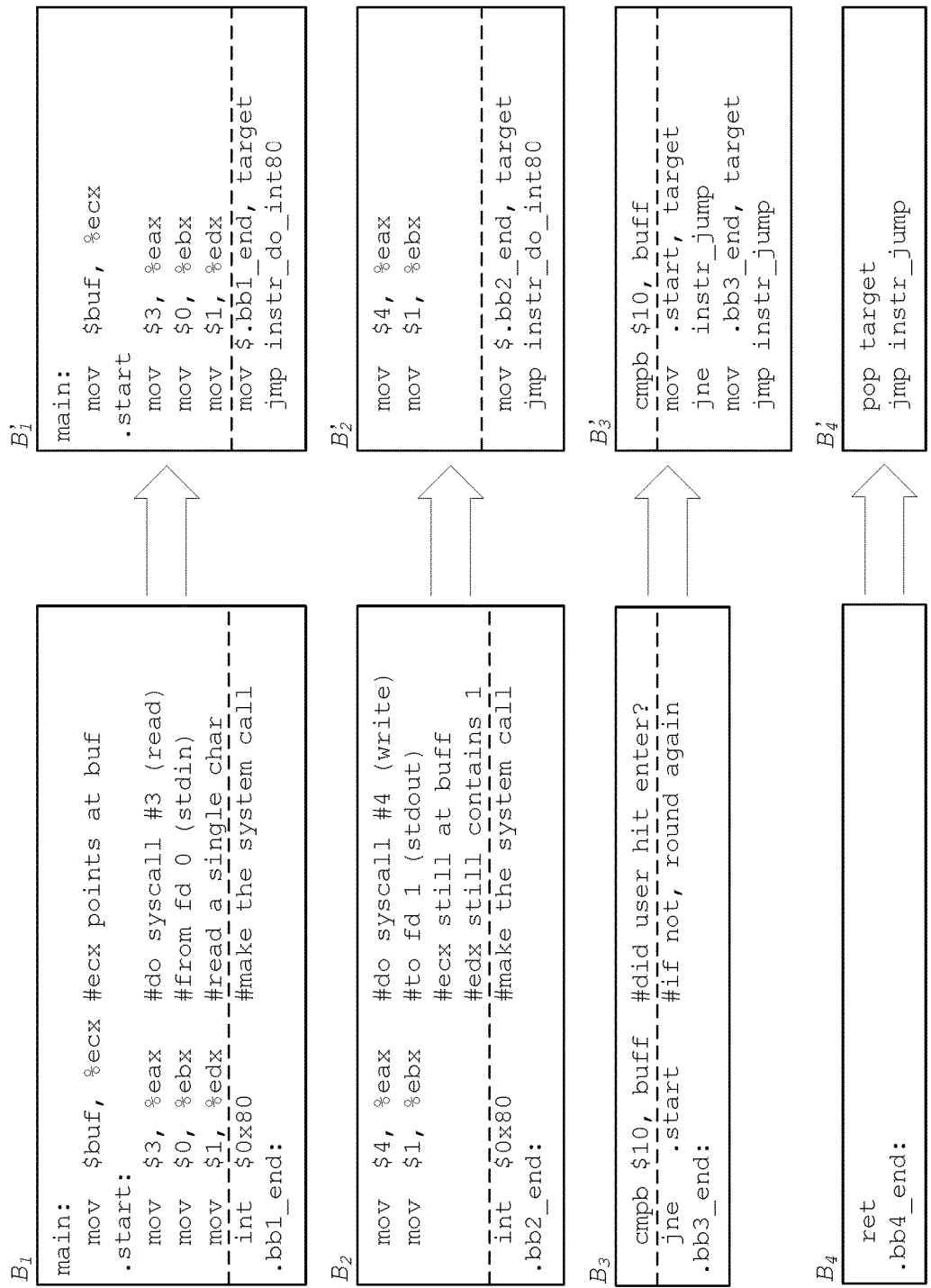
FIG. 11 shows a program P and its instrumented counterpart P'.

FIG. 11 shows the program in the previous example broken into its four basic blocks, and how those basic blocks are copied, and how the basic block terminator instruction for Bn is replaced in B'n with one or more instructions that branch into the instrumentation code. The label target is used to store the uninstrumented address at which control would have proceeded in the uninstrumented version of the program; the instrumentation code will convert this to the address of the corresponding instrumented basic block and jump there.

The copying and modifying of basic blocks for instrumentation may be carried out statically before the program is executed, or may be done dynamically during the program's execution (i.e. on demand). Here, when the instrumentation code looks up the address of an instrumented basic block given the corresponding uninstrumented address, if the instrumented version cannot be found then the uninstrumented block is copied and the basic block terminator translated. (Our implementation uses the dynamic approach.)

We will next describe making replay deterministic. Using the instrumentation technique described in 3 we are able to remove all sources of non-determinism from a process. We deal with each of the four kinds of determinism separately in subsections below.

Non-deterministic instructions: During the reference execution the results of all non-deterministic instructions (including system calls) are recorded in an event log. When playing a process forwards from a snapshot in order to recreate a previous state, the process is said to be in 'replay mode'. Here, the instrumentation code ensures that non-deterministic instructions are not executed, and instead their results are synthesised using data stored in event log. There the process' internal state is artificially reconstructed to reflect the results of the corresponding non-deterministic instruction produced during the reference execution.

For example, when replaying a system call, this means restoring the system call's return code, as well as any of the process's memory that was modified as a result of the system call.

External state (operating system resources): Note that it is not necessary to reconstruct the process' external state when recreating the results of non-deterministic instructions, because the process' interaction with its external state is in general governed entirely through system calls. For example, consider a process the opens a file for reading during the reference execution. The process will receive a file descriptor (also known as a file handle) which it will use with future calls to the OS to read from the file. The file descriptor is obtained and used with system calls. These system calls will be shortcut in the replay process. In effect, the instrumentation code will ensure that the replay process 'believes' that it has the file open for writing, but in fact it does not.

However, this is not true for OS resources that are visible from the process' internal state. As an example, consider a call to the OS to expand a process' address space (i.e. the memory it can access). Since this affects a resource which the replay process will access directly (i.e. memory), this system call should be reissued on replay to ensure that the effects of the non-deterministic instruction in question are faithfully replayed.

Note that memory mapped files are not treated specially; the entire contents of the file that is mapped are preferably recorded in the event log so that the effects of the memory map operation may be replayed. This is because the memory mapped file may be in a different state (or may not even exist) during replay. However, it is possible to optimise this case by recording and replaying the on-demand mapping of pages of such files. Here, when a process maps a file during the reference execution, the instrumentation code ensures that the process does not really map the file, although the instrumented program is 'unaware' of this. This means that when the process attempts to access the pages of the file it believes are mapped, it will fault. The instrumentation code intercepts these faults, and maps the pages from the file, recording the contents of those pages in the event log. On replay, again the file is not mapped. However, this time when the replay process faults accessing the pages, the instrumentation code obtains the contents of those pages from the event log, and maps the pages and initialises them appropriately. Alternatively, memory mapped files may be considered as shared memory, and dealt with as described below.

Asynchronous events: It is important that asynchronous events are replayed substantially exactly as they occur during the reference execution. During the reference execution, we use instrumentation to obtain a sufficient level of control over when asynchronous events happen, so that these events may be faithfully reproduced in replay mode. This means that all asynchronous events are preferably delivered to the instrumented program at basic block boundaries.

Asynchronous messages: Many modern operating systems provide a facility where an application can register an asynchronous event handling function. When the asynchronous event occurs, the operating system interrupts the program, transferring control directly to the handler function. When the handler function returns, the program proceeds as before interruption. This mechanism may be referred to as asynchronous signal delivery, or software interrupt servicing.

Such asynchronous events are preferably controlled to ensure that they are essentially entirely repeatable. To achieve this, during the reference execution, the instrumentation code intercepts system calls to set up a handler for an asynchronous message. The request is manipulated such that the instrumentation intercepts asynchronous messages.

Figure 12:
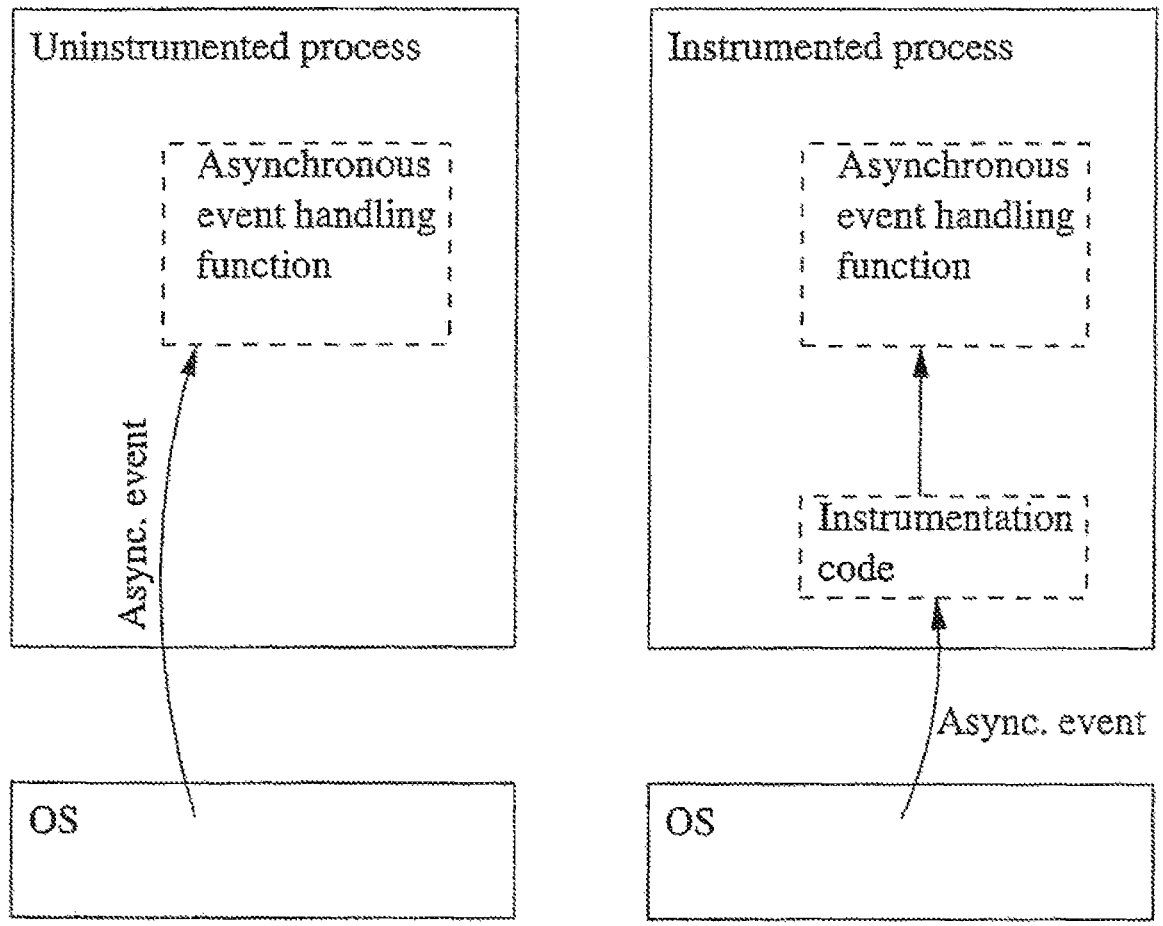
FIG. 12 shows interception of asynchronous events.

This is depicted in FIG. 12. The instrumentation code does not deliver the asynchronous notification directly to the program (i.e. it will not directly call the program's asynchronous event handler function). Instead the instrumentation code's event handling function record the asynchronous event to the event log, and then arrange for the event handler to be executed under the control of instrumentation.

When replaying, asynchronous events are not delivered to the replay process at all. Instead, each time a basic block is executed, the event log is checked. If an event is scheduled for the current basic block, then the process's event handling function is called, thus faithfully replaying the asynchronous event.

As well as providing determinism, this mechanism also ensures that the asynchronous event handling function is instrumented when it is called. Otherwise, if the operating system is allowed to call the program's event handling function directly, then the original, uninstrumented code will be called, and we will 'lose' instrumentation.

Note that message-based systems such as Microsoft Windows® use a system call to retrieve the next message from a message queue; the mechanism outlined above covers this case.

Threads: There are two main ways to implement multithreading within a process: kernel managed threads, and user managed threads. With user-managed threads, a user-mode library is responsible for threading. Thread pre-emption is performed by the library by responding to asynchronous timer events—hence any non-determinism resulting from user-managed multithreading can be removed using the techniques described above with reference to Asynchronous events.

However, most modern computer systems use kernel-managed threads. Here the operating system kernel is responsible for switching and otherwise managing threads, in general entirely without direct support from the application. There are several mechanism that can be employed to obtain deterministic kernel-managed threads.

One technique is to use the instrumentation code to implement 'virtual-kernel-managed threads', which involves the instrumentation code effectively providing user-managed threads, but letting the application 'believe' it is using kernel managed threads. Here, the system call to create a new kernel managed thread is intercepted by the instrumentation code, and subverted such that the instrumentation code creates a virtual kernel-managed thread within the single real kernel managed thread. The instrumentation code multiplexes all virtual kernel-managed threads onto a single real kernel-managed thread. This means that thread switching is under control of the instrumentation code and can be made essentially entirely deterministic. The instrumentation code can provide pre-emptive multithreading by effecting a virtual kernel-managed thread switch every n basic blocks (e.g. where n=10,000).

Here, care must be taken if we wish to ensure deadlock is avoided. If a virtual kernel-managed thread blocks waiting for the action of another virtual kernel-managed thread, since both virtual threads are running within a single real thread, deadlock can result. (A particularly common example of this problem is when two virtual kernel-managed threads contend on a mutual exclusion primitive; if care is not all virtual kernel-managed threads will deadlock). One way to avoid deadlock on a UNIX system to periodically arrange for the process to be delivered an asynchronous timer signal, such that blocking system calls will be interrupted, returning EINTR.

An alternative mechanism involves letting the program create kernel-managed threads as normal, but subverting the thread creation such that the instrumentation code has control over which thread is executing at which time. This might involve modifying the threads' priorities such that the instrumentation code can control which thread the OS will execute, or perhaps artificially blocking all but one thread at a time by e.g. having all kernel managed threads contend on a single kernel-managed mutex (which we shall call 'the debugging mutex'). This technique would also suffer a similar deadlock problem referred to above. Here if the kernel-managed thread that owns the mutex waits for an operation to be completed by another thread, the system will deadlock. (This is because the other thread will never be able to complete its work because it is waiting for the debugging mutex, yet the thread that owns the debugging mutex will never release it because it is waiting for that other thread.) Fortunately, the only way a thread can block awaiting the result of another is through a system call. Therefore, this problem can be overcome by ensuring that any thread drops the debugging mutex before entering any system call that may block, and then takes it again on return from said system call (note that there is no problem if a thread "busy-waits" because eventually it will execute a maximum number of basic blocks and then drop the debugging mutex). However, if the debugging mutex is to be dropped when a system call is issued, care must be taken to ensure that the system call does not modify the program's internal state in a way that voids determinism. For example, if the system call is reading data off the network and writing that data into the program's address space while concurrently another thread that holds the debugging mutex is reading that same memory, non-deterministic behaviour will result. Fortunately, this problem can be avoided be having the system call read not into the program's internal state, but into the event log. After the debugging mutex has been taken on behalf of the thread that issued the system call, then the data that was read by the system call into the event log can then be copied into the program's internal state. This trick can be implemented with relatively little work, since we already have the requirement that system calls that write into user memory have their results stored in the event log. Therefore, rather than have the system call read into program memory and then copying that data into the event log, we instead subvert parameters to the system call such that data is read directly into the event log, and have the instrumentation code subsequently copy from the event log into program memory, but only once the debugging mutex has been taken.

Shared memory: If a process being debugged shares memory with another process, it is possible to exploit the operating system's memory protection mechanism to provide deterministic replay.

Suppose that there are two processes, A and B, that share some portion of memory M, such that both processes have read and write permissions to access M. Process A is being run under instrumentation for bidirectional or backwards debugging, but process B is not. The shared memory M is initially mapped such that process B has read-only access, and A has full access. We describe this situation as process A having ownership of memory M. Any attempt by process B to read memory M will succeed as normal, but any attempt by process B to write to M will result in a page fault. This fault is responded to by memory M being mapped read/write to process B, and unmapped completely from process A. We refer to this process B taking ownership of the memory. Here, any attempt to access M (either for reading or for writing) by A will result in a page fault. This is responded to by reverting ownership of M to A, but in addition sufficient state being stored in the event log to replay the changes to M made by B. That is, the difference of the memory M between the point when A last had ownership of that memory and the current time is stored in the event log.

When replaying, the difference in memory is retrieved from the event log and applied at the appropriate time. Thus the effect on A of B's asynchronous modification of memory M can be replayed deterministically.

Note that the above scheme can easily by generalised so that process B is actually a group of one or more processes.

An alternative approach is to record in the event log every memory read performed by A on the shared memory M. This has the advantage of being a simpler implementation, but depending on the usage of the shared memory may result in the recording of an unacceptable amount of state in the event log, as well as adversely affecting temporal performance.

We will next describe implementation and structure of the event log. As we have seen, there are several kinds of events that need to be recorded in the event log: Non-deterministic instruction results (including the return codes and memory modifications made by system calls), Asynchronous events (including asynchronous signal delivery), Thread Switches, and Shared memory transactions.

Preferably the memory used to store the event log is accessible by the process in record and replay mode. This means that if the UNIX fork facility is used to snapshot processes, then the memory used to store the event log should be shared between each process created with these forks. However preferably the event log (and all memory used by the instrumentation code) is not usable as the internal state of the program being debugged; to prevent this all memory transactions by the program being debugged can be intercepted by the instrumentation code, and access to memory used by the instrumentation code (including the event log) can be denied to the program being debugged.

Preferably the event log itself is stored as a linked list, where each node contains the type of event, data sufficient to reconstruct that event during replay, and the time at which that event happened (where time is based on the number of instructions executed to that point or some approximation thereof, preferably combined with the number of non-deterministic or asynchronous events executed to that point).

Then when in replay mode, between each basic block it is necessary only to inspect the current time, and compare it with the time of the next non-deterministic event in the event log. In the common case that the current time is less than the time for the next non-deterministic event, the coming basic block can be executed without further delay. If there is a non-deterministic event to replay in the coming basic block then the instrumentation must arrange for the effects of the said non-deterministic event to reconstructed at the corresponding time in the coming basic block.

We will next describe searching history. In general, it is more useful for a bidirectional or backwards debugger to be able to search history for a particular condition, as opposed to wind a program back to an absolute, arbitrary time. Some examples of the kinds of conditions it is useful to be able to search are:

The previously executed instruction
The previously executed source code line

The previously executed source code line at the current function call depth

The call site for the current function

The previous time an arbitrary instruction or source code line was executed

More generally, it is useful to be able to rewind a debugged program to the previous time an arbitrary condition held, such as a variable containing a given value, or even completely arbitrary conditions, such as some function returning a particular value.

We have implemented an algorithm to search an execution history for such arbitrary conditions. The most recent snapshot is taken, and played forward testing for the condition at the end of each basic block. Each time the condition holds, the time is noted (if a time is already recorded because the condition held earlier, it is overwritten). When the history is replayed up to the debug point, the most recent time at which the condition held will be stored. If no such time has been recorded because the condition did not hold since the most recent snapshot, then the search is repeated starting from the next most recent snapshot, up to the most recent snapshot. That is, suppose that the debugged program is currently positioned at time 7,000, and there are snapshots at times 0; 2,000; 4,000; and 6,000. We start at the snapshot at time 6,000 and play forwards until time 7,000, testing for the condition between each basic block. If the condition never holds between times 6,000 and 7,000, then we rewind to the snapshot taken at 4,000, and play that forwards to 6,000, searching for the event. If the condition still isn't found to hold, we check 2,000-4,000, and so on.

Note that this algorithm will not work reliably with the instrumentation technique of FIG. 10 if searching for the most recent time at which a variable held a particular value. This is because a variable's value may change to and then from the required value entirely within a basic block. To overcome this, there is an enhancement to the instrumentation technique shown in FIG. 10—each memory write operation is considered a basic block terminator. (This approach can also be used to ensure that a program that has gone hay-wire does not write over the event log or other instrumentation data structures.) This form of instrumentation will operate less efficiently than the one shown in FIG. 10; however should the performance become problematic, it is possible to run with both forms of instrumentation, switching between the two as necessary.

(Note that the algorithm described in this section does work reliably when searching for particular values of the program counter with the instrumentation technique shown in FIG. 10.)

We have described a bidirectional or backwards debugging mechanism that can be conveniently implemented on most modern operating systems for example including, but not limited to, Linux and Windows®. A process can be rewound and its state at any time in its history can be examined. This is achieved by regularly snapshotting the process as it runs, and running the appropriate snapshot forward to find the process' state at any given time. Non-determinism may be removed using a machine code instrumentation technique.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A method of generating an output log for analysis of a computer program, the method comprising:
   receiving a recording of an execution of the program;
   receiving an original output log generated based upon the execution of the program associated with the recording or generated based upon a replaying of the recording, the output log including the output from one or more existing print instructions included in the program;
   receiving an additional print instruction to print a value of a data item and an indication of a point in the program at which the additional print instruction is to be evaluated;
   determining a corresponding point in the recording of the execution based upon the indication of the point in the program;
   evaluating the additional print instruction based upon the recording of the execution and the determined corresponding point without re-compiling or re-executing the program to determine an output of the additional print instruction; and
   generating a simulated output log by combining the output of the one or more existing print instructions included in the original output log and the output of the additional print instruction;
   wherein combining the output of the one or more existing print instructions and the output of the additional print instructions includes determining a position to insert the output of the additional print instruction within the one or more print instructions included in the original output log according to the order in which the one or more existing print instructions are executed in the recording of the execution and the determined corresponding point in the recording associated with the additional print instruction and inserting the output of the additional print at the determined position.

2. A method according to claim 1, wherein generating the simulated output log further comprises:
   inserting the output of the additional print instruction into an intermediate data structure, wherein the intermediate data structure is arranged to store the output of any print instructions in the program; and
   generating the simulated output log based upon the intermediate data structure.

3. A method according to claim 2, wherein each data item stored in the intermediate data structure is associated with an identifier and the intermediate data structure is ordered based upon the identifier.

4. A method according to claim 3, wherein the identifier comprises a first portion based upon a point in time of the recording of the execution of the program and a second portion based upon a location identifier associated with a point in the program.

5. A method according to claim 4, wherein the first portion is based upon a basic block count.

6. A method according to claim 4, wherein the second portion is based upon an instruction address.

7. A method according to claim 1, wherein determining the corresponding point in the recording of the execution of the program further comprises:
   determining a location identifier associated with a point in the program based upon the received indication;
   replaying the recording; and halting replay of the recording based upon the determined location identifier.

8. A method according to claim 7, wherein determining a location identifier further comprises determining an instruction address in the program based upon the received indication.

9. A method according to claim 8, wherein halting replay of the recording further comprises:
   determining that a program counter value is equivalent to the instruction address; and
   halting replay of the recording based upon the determination.

10. A method according to claim 1, wherein evaluating the additional print instruction is further based upon program state information at the corresponding point in the recording of the execution of the program.

11. A method according to claim 1, further comprising: displaying the simulated output log in a window of a graphical user interface.

12. A method according to claim 11, wherein evaluating the additional print instruction is further based upon program state information at the corresponding point in the recording of the execution of the program and replaying the recording of the execution is based upon the visible region of the window.

13. A computer program comprising computer readable instructions configured to cause a computer to carry out a method according to claim 1.

14. A computer apparatus comprising:
   a processor arranged to read and execute instructions in memory;
   wherein the processor readable instructions comprise instructions arranged to cause the computer to carry out a method according to claim 1.

* * * * *